Jan. 13, 1925.
G. A. KING
1,523,357
CHAIN BALL
Filed Dec. 22, 1923
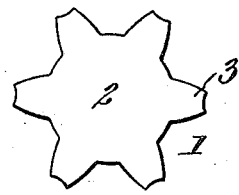
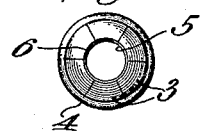
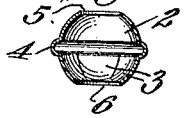
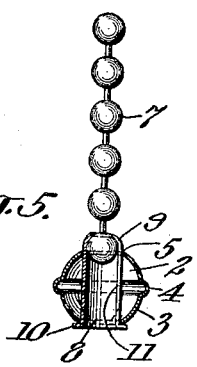
Inventor:
George A. King
by
Wm. H. Fincel
Attorney.

Patented Jan. 13, 1925.

1,523,357

UNITED STATES PATENT OFFICE.

GEORGE A. KING, OF WATERBURY, CONNECTICUT, ASSIGNOR TO SCOVILL MANUFACTURING COMPANY, OF WATERBURY, CONNECTICUT, A CORPORATION OF CONNECTICUT.

CHAIN BALL.

Application filed December 22, 1923. Serial No. 682,258.

*To all whom it may concern:*

Be it known that I, GEORGE A. KING, a citizen of the United States, residing at Waterbury, in the county of New Haven and State of Connecticut, have invented a certain new and useful Improvement in Chain Balls, of which the following is a full, clear, and exact description.

The object of this invention is to provide a one-piece beaded ball or pendant for use particularly on pull-chains for lamp sockets, although the invention is not limited to such use.

The invention consists of a one-piece, circumferentially beaded, hollow ball or pendant adapted to be connected with a pull-chain or other support by any suitable coupling which will permit of the connection and disconnection of the two when and as desired or necessary, as I will now explain and finally claim.

In the accompanying drawings illustrating the invention, in the several figures of which like parts are similarly designated, Figure 1 is a plan view of one form of flat blank from which the ball or pendant may be made. Fig. 2 is a bottom plan view, Fig. 3 is a side elevation, and Fig. 4 is a vertical section of the formed ball or pendant. Fig. 5 illustrates in section and elevation one form of available coupling and one use of the device.

The blank 1, of approximate star shape, is drawn by successive operations into hollow globular form, the solid center 2 of the blank forming the top of the ball or pendant, and the rays or fingers 3 forming the bottom thereof, with an intermediate outwardly projecting bead 4. An opening 5 is made in the top, and the converged ends of the rays or fingers form a complemental alined opening 6.

The bead 4, extending circumferentially around the middle of the ball, serves to reinforce the hollow globular structure and also adds a pleasing appearance.

Making the ball or pendant of one piece effects considerable economy in manufacture, and gives a product that is quite as efficient, durable and sightly as balls for the same use heretofore made of two pieces.

The chain or support 7 may be of any approved construction, the one shown being of common and well known form, and consisting of a series of balls linked together.

The ball or pendant and the chain or support may be connected in any of a variety of ways, but the specific embodiment of the invention shown in the drawings and hereinbefore described is especially adapted for use in connection with a longitudinally slotted socket or sleeve, such as shown in the Thomas Patent, No. 1,173,896, granted Feb. 29, 1916, the socket or sleeve being herein shown in Fig. 5, and designated 8, and having a partially closed end 9 with a bottom flange 10 and a longitudinal slot 11, one of the balls of the chain being placed in the coupling socket or sleeve at the bottom with the connecting link aligned with the slot 11 and then drawn up to the partly closed end. This coupling socket or sleeve is inserted in the ball or pendant through the opening 6 and so as to extend upwardly and project out of the opening 5, the slot serving to impart sufficient resilience to the coupling socket or sleeve to hold the latter in given position in the ball or pendant.

Variations in details of construction are permissible within the principle of the invention and the scope of the claim following.

What I claim is:—

A one-piece hollow metal ball, having one portion solid and the opposite portion composed of a series of converged rays or fingers, and a circumferential bead formed in and between these two portions.

In testimony whereof I have hereunto set my hand this 19th day of December A. D. 1923.

GEORGE A. KING.

Witnesses:
CHARLES FEHL,
A. D. COWPERTHWAIT.